(12) United States Patent
Wu (10) Patent No.: US 7,255,568 B1
(45) Date of Patent: Aug. 14, 2007

(54) POWER PLUG

(75) Inventor: Jui-Hsiung Wu, Taipei (TW)

(73) Assignee: Well Shin Technology Co., Ltd, Neihu District, Taipei (TW)

( * ) Notice: Subject to any disclaimer, the term of this patent is extended or adjusted under 35 U.S.C. 154(b) by 0 days.

(21) Appl. No.: 11/563,297

(22) Filed: Nov. 27, 2006

(51) Int. Cl.
*H01R 39/00* (2006.01)
(52) U.S. Cl. ........................................ 439/23; 439/640
(58) Field of Classification Search .................. 439/11, 439/13, 20–22, 24–28, 134, 640
See application file for complete search history.

(56) References Cited

U.S. PATENT DOCUMENTS

| | | | |
|---|---|---|---|
| 5,775,921 A * | 7/1998 | Chou | 439/21 |
| 6,089,921 A * | 7/2000 | Chou | 439/640 |
| 6,595,782 B1 | 7/2003 | Hsiao | |
| 6,793,499 B1 * | 9/2004 | Chen | 439/13 |
| 2004/0089760 A1 * | 5/2004 | Wu | 242/388.1 |

* cited by examiner

*Primary Examiner*—James R. Harvey
(74) *Attorney, Agent, or Firm*—WPAT, P.C.; Anthony King (57) ABSTRACT

A power plug, comprising: a hollow housing, with a wire hole in the end. A limitative set is contained within the hollow housing. There are also at least two bases, placed in the limitative slot and revolvingly contacting to each slip ring, are insulated by the loop located within the limitative set, and at least two blades. The ring rim of each base extends upward to form a ring wall. The ring wall defines at least a notch through the lateral plane of the ring wall, and the inside of the ring wall contains a contact piece. The contact piece has a contact arm that is embedded in the notch. The tip of the contact arm bends to form a contact part and extends out of the notch to tightly contact the contact piece by the contact part. Each of the blades that is mounted in each base electrically contacts the contact piece.

5 Claims, 9 Drawing Sheets

POWER PLUG

BACKGROUND OF THE INVENTION

1. Field of the Invention

The present invention relates to a plug, particularly to a power plug.

2. The Related Art

U.S. Pat. No. 6,595,782 issued on Jul. 22, 2003 discloses a conventional power plug. The conventional power plug normally has a housing, at least two connecting blades, at least two disks securely received in the housing, at least two slip rings each mounted on one of the two disks and power relative to the corresponding disk, and at least two securing elements each received in the housing to securely engage with the corresponding slip ring. After the two slip rings are securely connected to the securing elements and the two connecting blades are electrically connected to the two disks, the plug is able to rotate regardless of the connection between the two connecting blades and a power socket firmly fixed at a location.

The rotation of the power plug in this patent is accomplished between the slip ring and the collector ring. The collector ring, the slip ring and the insulator bring about different friction effects. Since the contact area of the friction is too wide, it will reduce the life of a frequently used plug, and may compromise the quality of life.

To overcome these shortcomings, the present invention tends to provide an improved plug which permits a reduction of friction between the collector ring and the slip ring to mitigate and obviate the aforementioned problems.

SUMMARY OF THE INVENTION

Accordingly, an object of the present invention is to provide a power plug with a hollow housing that has a wire hole at the end. A limitative set is contained within the hollow housing. The middle inner side of the limitative set extends interiorly to form a loop. The top of the loop defines a first limitative slot, and the bottom of the loop defines a second limitative slot. At least two slip rings are placed into the first and the second limitative slot respectively and are insulated by the loop located at the inner side of the limitative set. At least two bases are placed in the limitative slot, revolvingly contacted to each slip ring, and insulated by the loop located at the limitative set. At least two blades, mounted in each base, are electrically connected to the slip ring. The ring rim of each base extends upwardly to form a ring wall. The ring wall defines at least a notch through the lateral of the ring wall. The inside of the ring wall receives a contact piece. The contact piece has a contact arm which is embedded within the notch. The tip of contact arm bends to form a contact part and extends out of the notch to tightly contact the slip ring by the contact part. Each blade, which is mounted in each base, electrically contacts the contact piece.

In summary, the plug, by the three internal structures, might revolve at 360-degrees. Allowing the avoidance of harm caused by bending plug wires. Further, the 360-degree structure reduces the space used by electrical equipment and achieves the purpose of high security and high convenience.

BRIEF DESCRIPTION OF THE DRAWINGS

The present invention will be apparent, to those skilled in the art, by reading the following description of a preferred embodiment thereof, with reference to the attached drawings, in which.

DETAILED DESCRIPTION OF THE PREFERRED EMBODIMENTS

A power plug 1, according to preferred embodiments of the present invention, is illustrated in the figures, and provides the functional arrangement and formation to reduce the compromise on the quality of life.

Figure 1:
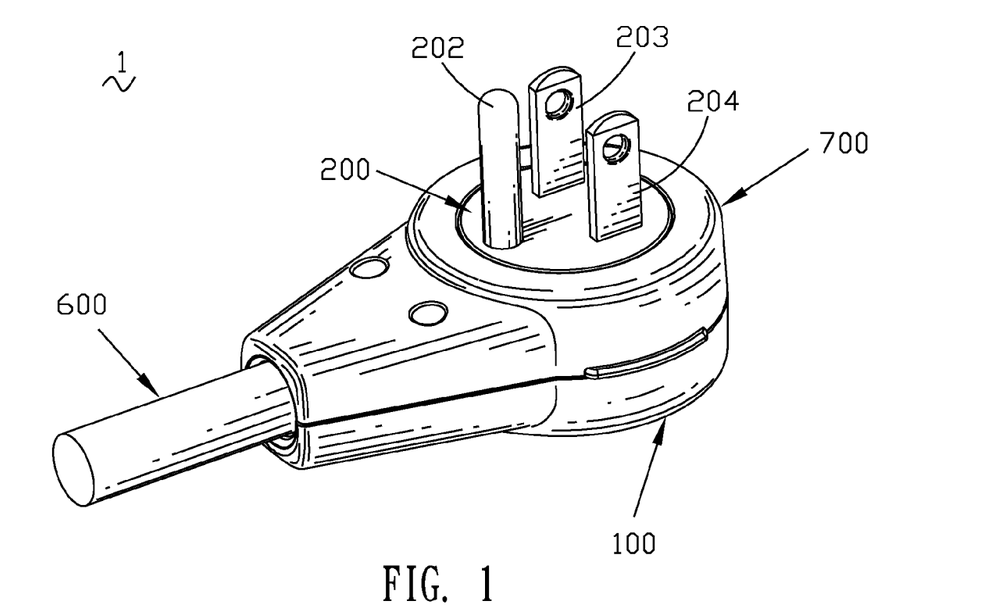
FIG. 1 is a perspective view of the power plug of the present invention.
Figure 2:
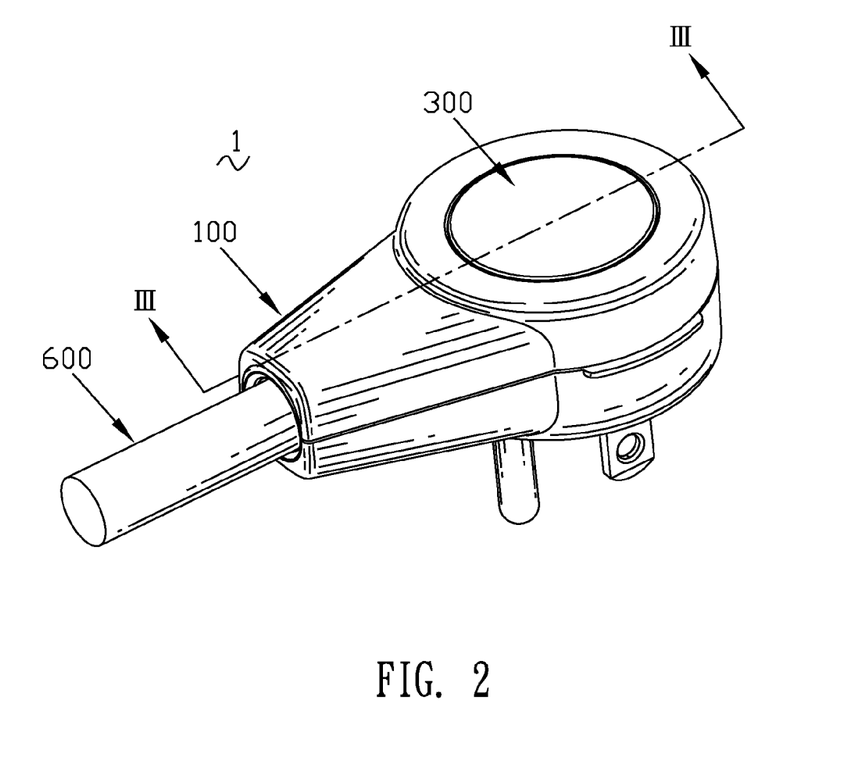
FIG. 2 is another perspective view of the power plug of the present invention.

Referring to FIG. 1 and FIG. 2, the power plug 1 includes a hollow housing 100. The hollow housing 100 includes a top cover 300. A foot cover 700 is coupled to the top cover 300. A rotating base 200 is mounted in a limitative set 400 (not shown). The limitative set 400 is mounted in the interior of the hollow housing 100. The end of the hollow housing 100 defines a wire hole where a wire 600 is received. Blades 202, 203 and 204 extend outwards from the rotating base 200.

Figure 3:
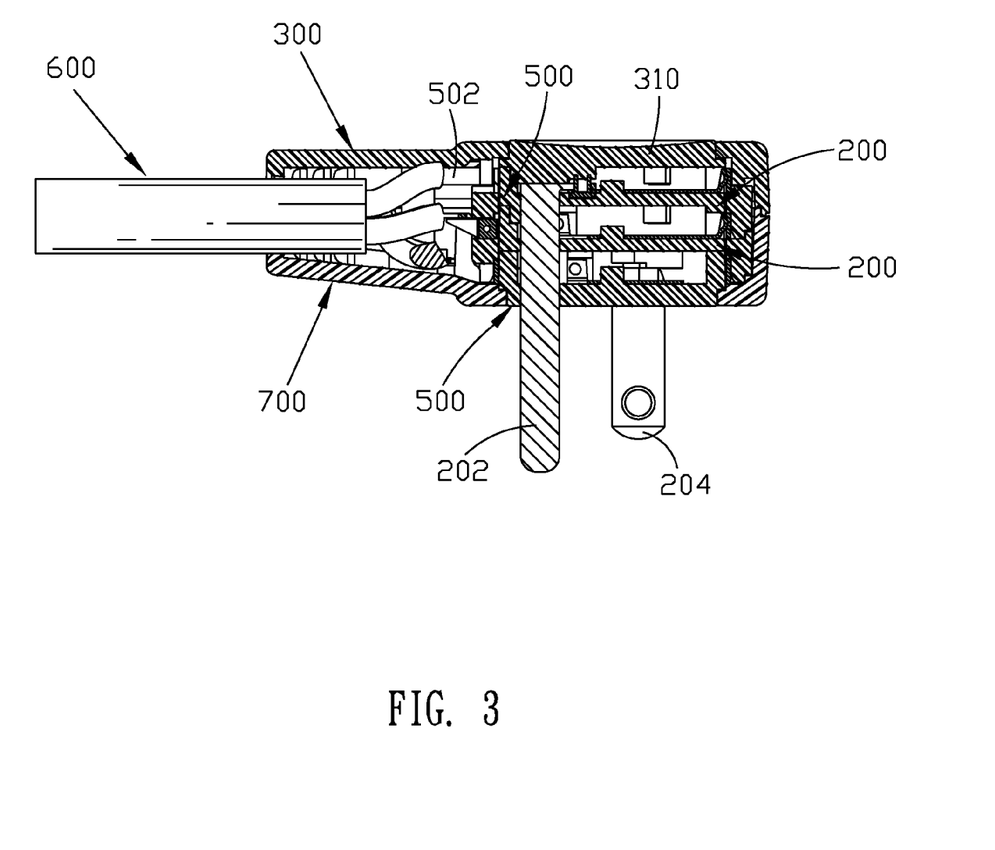
FIG. 3 is a cross-sectional view along the line III-III in FIG. 2.
Figure 4:
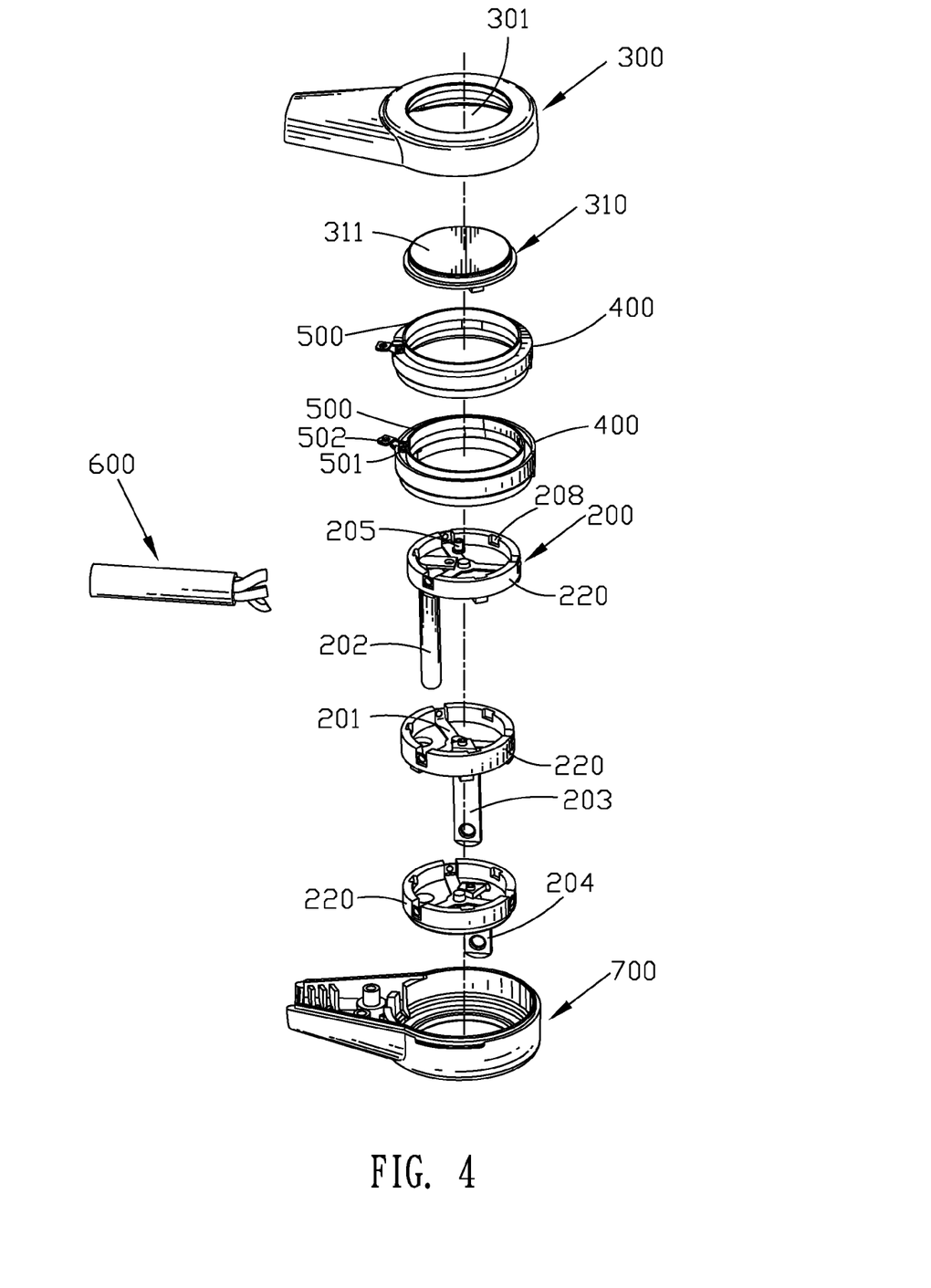
FIG. 4 is an exploded view of the power plug of the present invention.

Referring to FIG. 3 and FIG. 4, a rotating cover 310 is mounted on the top cover 300. Three rotating bases 200 are mounted from the top to the bottom between the top cover 300 and the foot cover 700. Each of the rotating bases 200 fastens the blades 202, 203 and 204 respectively. The wire 600 has three branches that electrically connects the blades 202, 203 and 204. The ring rim of each rotating base 200 extends upward to form a ring wall 220. A contact piece 201 is placed inside of the ring wall 220. The wire 600 connects to a contact lump 502 extended from the slip ring 500. The slip ring 500 mounts on the exterior of the rotating base 200. When the plug revolves, the rotating bases 200 revolve, along with the blades 202, 203 and 204. The blades 202, 203 and 204 connect separately to the wire 600 through the contact lump 502.

Figure 5:
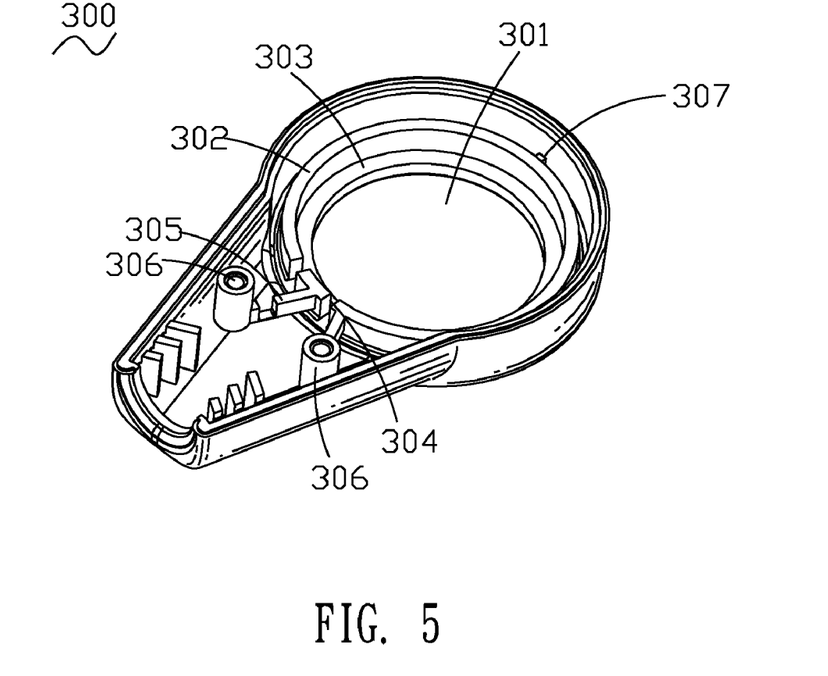
FIG. 5 is a perspective view of the top of the cover.

Referring to FIG. 5, a ring desk 302 extends upward from the inside of the top cover 300. The ring desk 302 is used to press the top limitative set 400 and divide the top cover 300 into an inside and outside chamber. A center hole 301 is defined by the inside chamber of the top cover 300. The periphery of the center hole forms a step edge 303. The step edge 303 stops a rotating cover 310 from falling out of the hollow housing 100. The front of the ring desk 302 protrudes to form a protrusion 307. The end of the ring desk 302 defines two grooves 304. A bar 305, that is T shaped, is set between two grooves 304. The groove 304 on the ring desk 302 is used to limit a limitative end 501 formed on the slip ring 500. The bar 305 is locked into a spiral hole 306 on the top cover 300, through a pass hole 709 on the foot cover, that then forms a 360-degree power plug.

Figure 6:
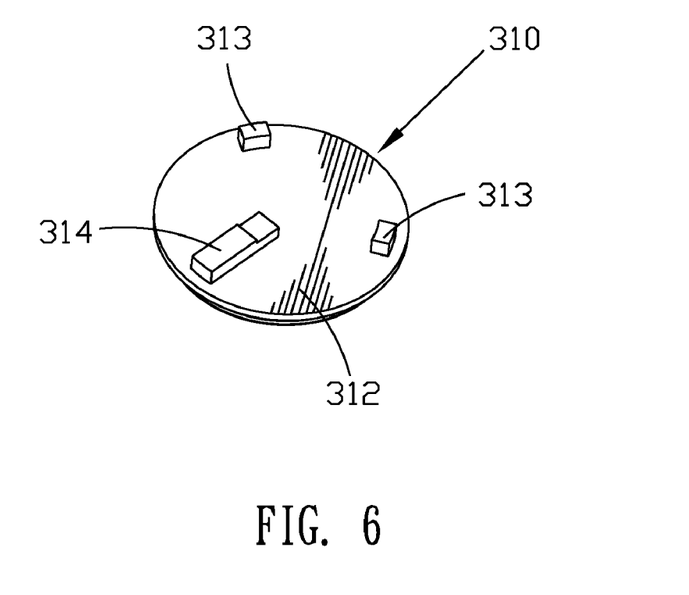
FIG. 6 is a perspective view of the rotating base.

Referring to FIG. 4 and FIG. 6, the rotating cover 310 is divided into an up circular step and a down circular step. The rotating cover 310 has a top surface 311 and a bottom surface 312. The top surface 311 is inserted into the center hole 301. A ridge 313 and a convex body 314 is mounted on the bottom surface 312. The convex body 314 is then used to press the blade 202.

Figure 7:
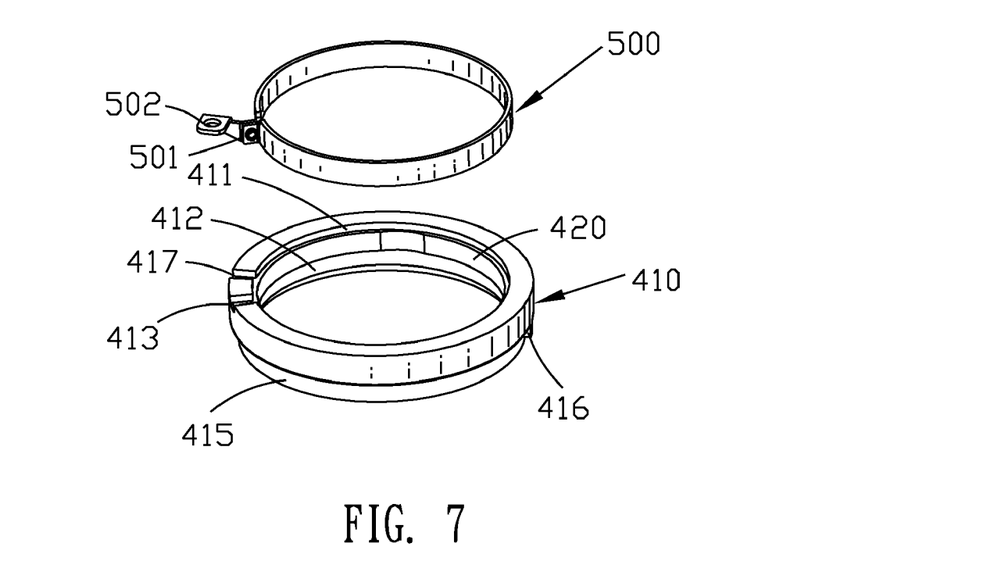
FIG. 7 is a perspective view of the slip rings and the limitative set.
Figure 8:
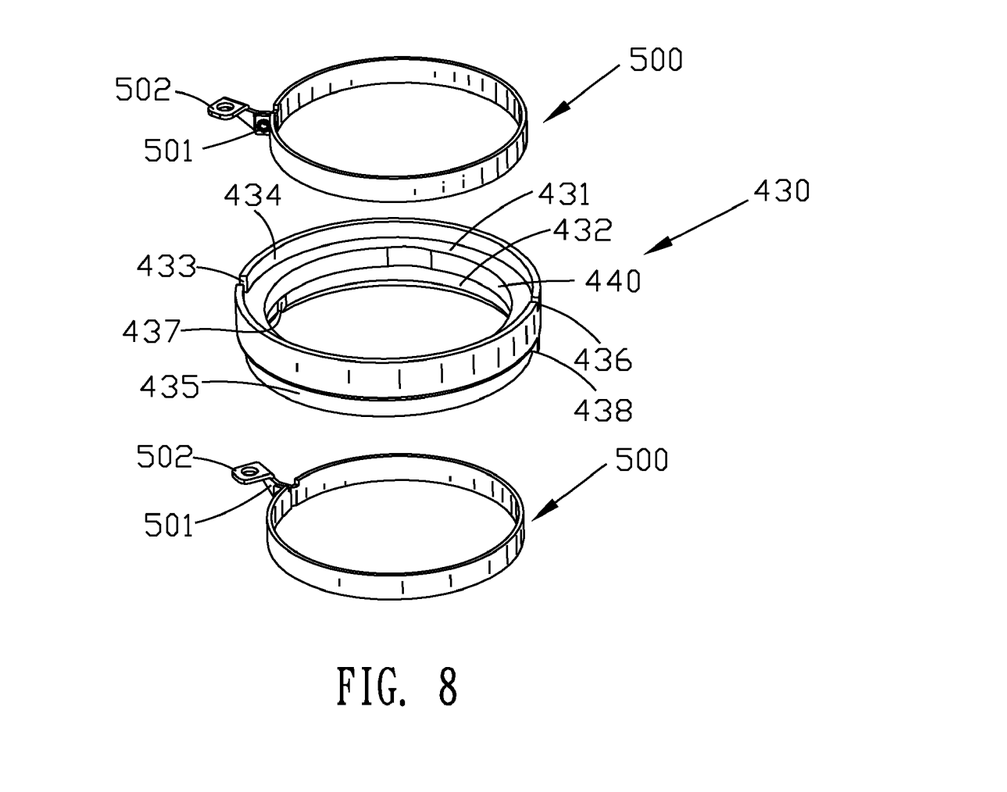
FIG. 8 is another perspective view of the slip rings and the limitative set.

Referring to FIG. 7 and FIG. 8, the limitative set 400 has a first limitative set 410 on the upside and a second limitative set 430 on the downside. The middle inner side of the first limitative set 410 extends inward to form a first loop 420. The top of the first loop 420 defines a first limitative slot 411 and the bottom of the first loop 420 defines a second limitative slot 412. Two slip rings 500 are placed into the first limitative slot 411 and the second limitative slot 412 respectively, insulated from each other by the first loop 420 and located on the inner side of the limitative set 410. The side of the slip ring 500 extends outward to form a limitative end 501. The top surface of the limitative end 501 and the top surface of the slip ring 500 are set at the same height level. The topside of the limitative end 501 is perpendicularly bent to form the contact lump 502, therefore the contact lump 502 is set in the horizontal plane.

The bottom outside of the first loop 420 extends inward to form a first ring trough 415. The top of the first limitative set 410 defines a first bar trough 413 and a second bar trough 417 through the sidewall of the first limitative set 410 at the left side. The top of the first limitative set 410 protrudes a raised place 416 on the right side, opposite to the first bar trough 413 and the second bar trough 417.

The slip ring 500 mounts on the interior of the limitative slot 411 and is stopped by the first loop 420. The limitative end 501 is embedded into the first bar trough 413 and extends outward of the first limitative set 410, so the contact lump 502 is received in the wire hole of the hollow housing 100 as shown in FIG. 3.

The middle inner side of the second limitative set 430 extends inward to form a second loop 440. The topside of the second loop 440 defines a third limitative slot 431 and a fourth limitative slot 432. The bottom side of the ring wall extends to form a second trough 436. A second raised place 438 mounts on the downside of the second trough 436. The third limitative slot 431 and the fourth limitative slot 432 receive two slip rings 500. The second limitative set 430 defines a third bar trough 433 on the bottom side and a fourth bar trough 437 on the top side.

The slip ring 500 mounts on the upside of the limitative slot 431 and is stopped by the second loop 440. The limitative end 501 inserts into the third bar trough 433. The contact lump 502 extends outward from the third bar trough 433. The contact lump 502 of the slip ring 500 that is mounted on the downside of the fourth limitative slot 432 extends outward from the fourth bar trough 437.

When the limitative set 400 is arranged together, the bottom surface 312 of the rotating cover 310 presses onto the first limitative set 410. The bottom of the first limitative set 410 is inserted into the third limitative slot 431 of the second limitative set 430. The first raised place 416 of the first limitative set 410 is inserted into the second trough 436 of the second limitative set 430, so that the limitative set 410 and the second limitative set 430 is arranged as a unit. The first trough 434 defined on the second groove 440 receives the slip ring 500, so that the limitative end 501 extends outward from the slip ring 500. The limitative end 501 is received into the second groove 440 then passes through the second bar trough 417 and the third bar trough 433.

Referring to FIGS. 9-14, the interior structure of the power plug 1 is divided into the inside and the outside stratum. The inside stratum is divided into the upper, middle and lower stratum. Each of stratums includes a rotating base 200. Each rotating base 200 contains a contact piece 201, a rivet 205 and a blade means.

Figure 9:
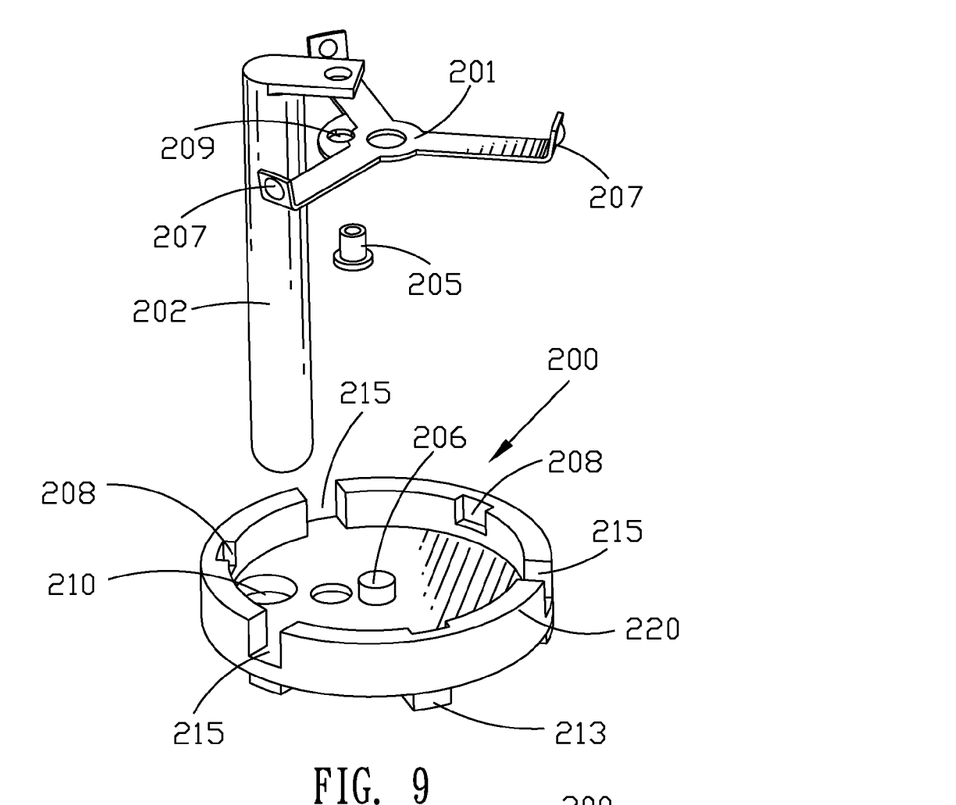
FIG. 9 is a perspective view of the inside of the upper stratum.
Figure 10:
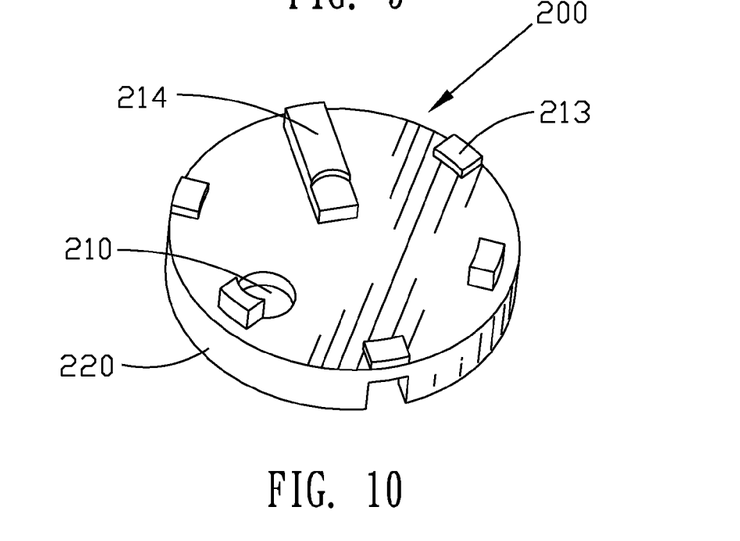
FIG. 10 is a perspective view of the rotating base at the upper stratum.

Referring to FIG. 9 and FIG. 10, the blade 202 is of a column shape. The top end of the blade 202 bends 90-degrees and possesses a round hole centered at the end. In the power plug 1, the bottom surface of the rotating base 200, mounted on the upper stratum, possess a round hole 210. The center of the bottom surface of the rotating base 200 also has a protruding a shaft 206. The ring rim of the rotating base 220 extends upward to form a ring wall 220. The ring wall 220 defines three notches 215 through the lateral of the ring wall 220 and a groove 208 set between each of notches 215.

A contact piece 201 is received in the inside of the ring wall 220. The center of the contact piece 201 has a circular cavity. Three contact arms radiate from the circular cavity and are embedded in three notches 215 respectively. The three contact arms are distributed around the circular cavity such that the angle between the contact arms is about 120-degrees.

Each contact arm is embedded in each of the three notches 215. The tip of each contact arms bends to form a contact part 207 and extends out of the notch 215 to tightly contact the slip ring 500 by the contact part 207. The blade 202 which is mounted in the rotating base 220 electrically contacts the contact piece 201. The side of the circular cavity in the contact piece 201 contains a penetration hole 209.

The circular cavity of the contact piece 201 receives the shaft 206. The blade 202 of the contact piece 201 is inserted in the round hole 210 and firmly mounted in the rotating base 200 of the upper stratum. The rivet 205 is inserted from the penetration hole 209 to the round hole defined in the top end of the blade 202 so as to firmly couple the blade 202 to the contact piece 201.

Three rectangular lumps 213 opposite to the notches 215 extend upward from the backside of the rotating base 200. A rectangular part 214 is mounted at the side of the rectangular lump 213. The end of the rectangular part 214 is arranged towards the center of the rotating base 200.

Figure 11:
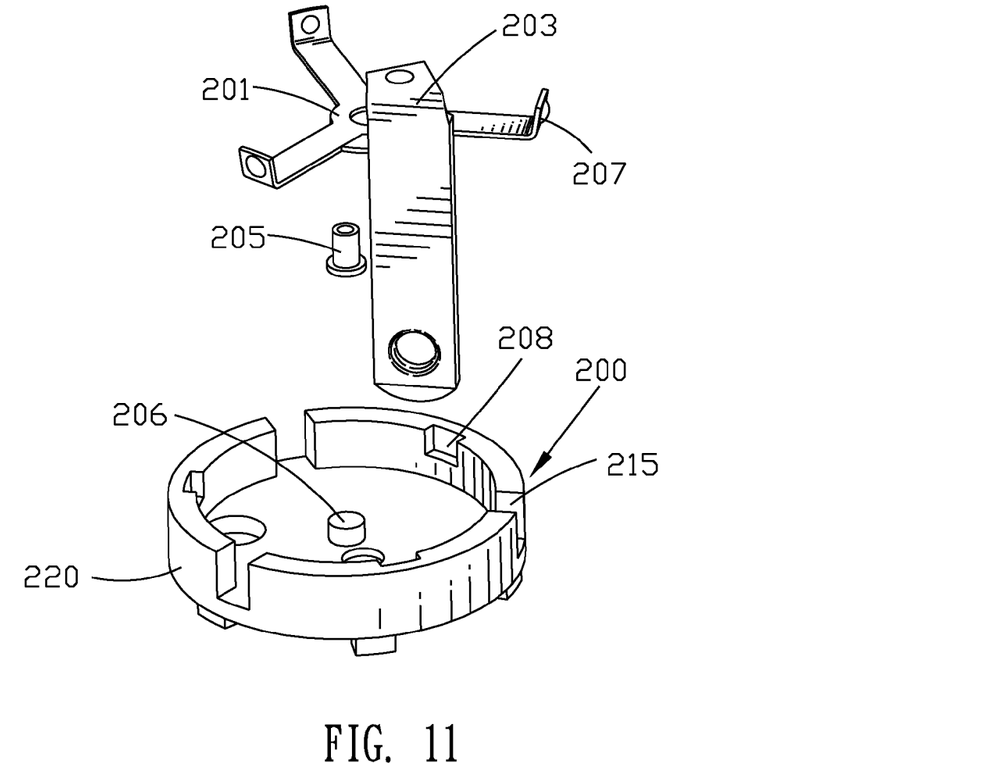
FIG. 11 is a perspective view of the inside of the middle stratum.
Figure 12:
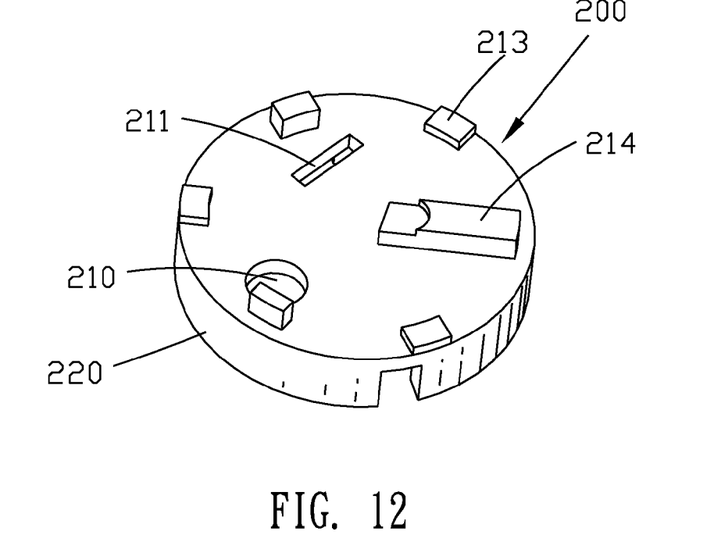
FIG. 12 is a perspective view of the rotating base at the middle stratum.

Referring to FIG. 11 and FIG. 12, the rotating base 200 mounted on the middle stratum of the power plug 1 and the blade 203 are disclosed. The middle stratum is similar to the upper stratum. Yet the difference is that the rotating base 200 in the middle stratum has a further addition of a first rectangle hole 211 and the blade 203 is of a flat shape. The top end of the blade 203 also bends 90-degrees and possesses a round hole centered at the end. In the power plug 1, the bottom surface of the rotating base 200 of the middle stratum contains the round hole 210. The blade 203 is inserted in the first rectangle hole 211. The blade 202, arranged from the upper stratum, is inserted into the round hole 210 defined in the middle stratum. Three protruding desks 213 of the upper stratum are embedded into the grooves 208 of the middle stratum. The protruding part 214 of the upper stratum is used to limit the blade 202 mounted on the middle stratum.

Figure 13:
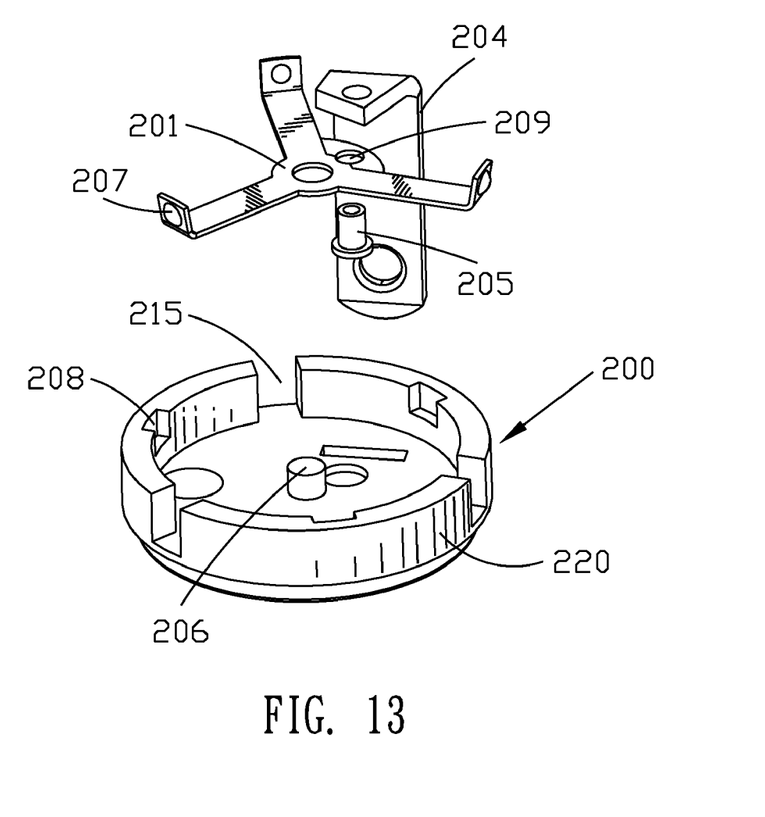
FIG. 13 is a perspective view of the inside of the lower stratum.
Figure 14:
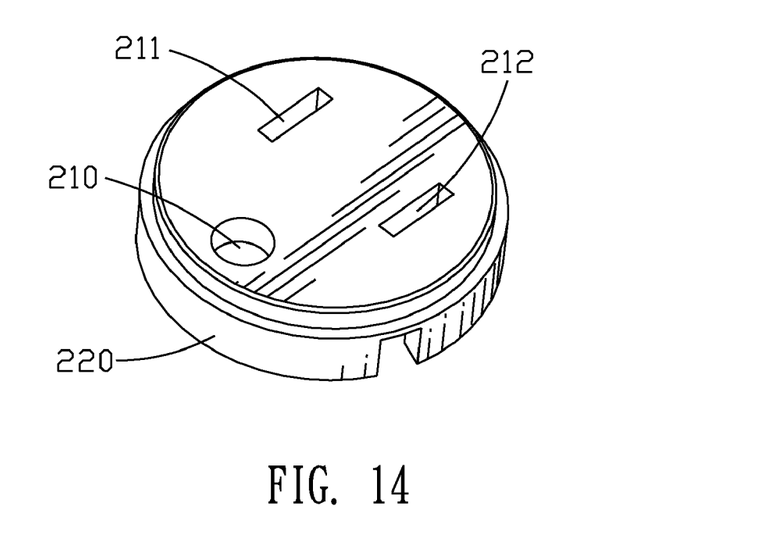
FIG. 14 is a perspective view of the rotating base at the lower stratum.

Referring to FIG. 13 and FIG. 14, the rotating base 200 mounted on the lower stratum of the power plug 1 and the blade 204 are disclosed. The bottom surface of the rotating base 200 in the lower stratum possesses an additional rectangular hole 212 and the blade 204. The blade 204 is of a flat shape and shorter then blade 203. The top of the blade 204 bends 90-degrees and possesses a round hole centered at the end to firmly fix the lower stratum of the rotating base 200. The round hole 210, the first rectangular hole 211 and the second rectangular hole 212 are defined in the rotating base 200 mounted on the lower stratum, so that the blade 202, 203 and 204 can extend from the backside of the rotating base 200 mounted on the lower stratum. The upper stratum, the middle stratum and the lower stratum are stacked together.

Figure 15:
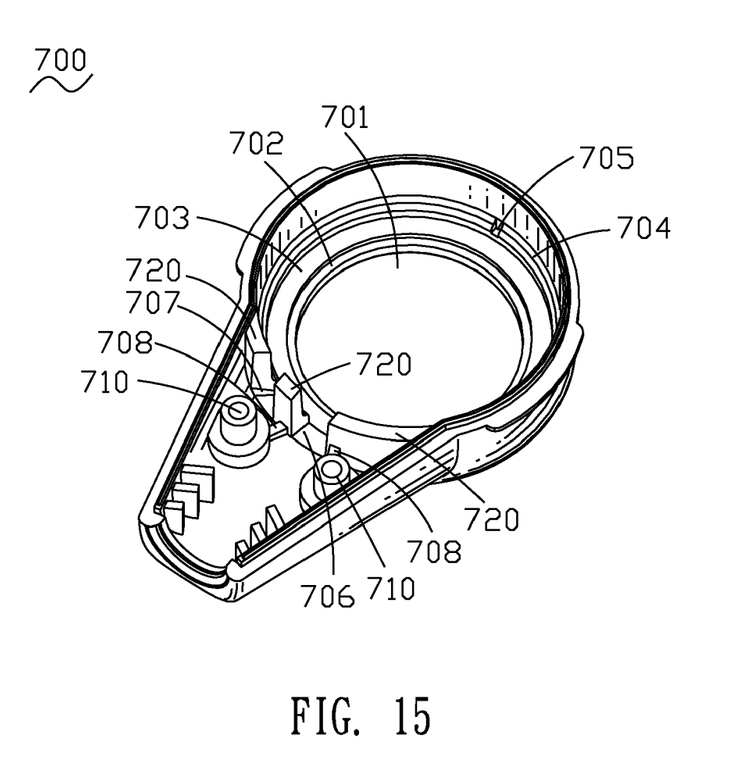
FIG. 15 is a perspective view of the foot cover.

Referring to FIG. 15, the foot cover 700 of the rotating base 200 is disclosed. The front end of the foot cover 700 contains a center hole 701. The lateral wall of the hollow housing 200 forms a first step stratum 702, a second step stratum 703 and a third step stratum 704. The first step stratum 702, the second step stratum 703 and the third step stratum 704 are arranged in turn from the outside to the inside in the hollow housing 100. The first step stratum 702 mounts the desk of the rotating base 216. The second step stratum 703 mounts the slip ring 500 and the limitative set 400. The left side of the second step stratum 703 defines a limitative though 705. The right side of the second step stratum 703 extends upward to form a camber wall 720. The camber wall 720 defines two sliding trough 706, 707, so that the wire hole connects with the center hole 701 and passes through the sliding troughs 706, 707. Two screws 710 are mounted in the right side of the foot cover 700. Two rectangular boards 708 are positioned between the sliding trough and the camber wall 720.

Figure 16:
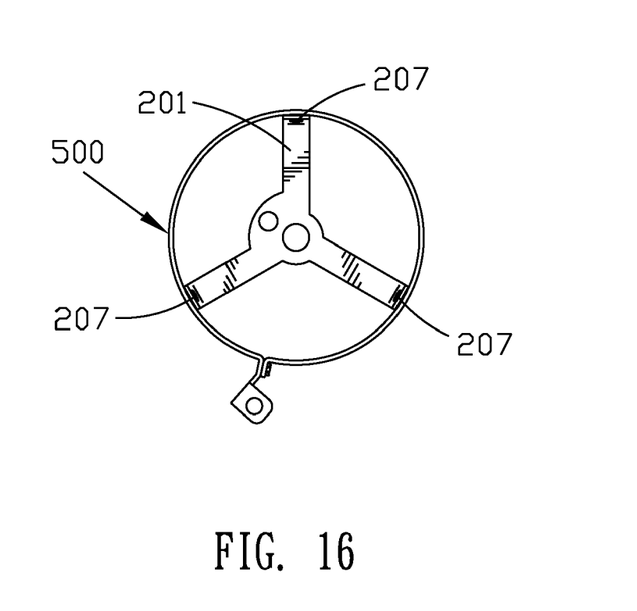
FIG. 16 is a perspective view of the connection for the slip rings and the contact part.

With reference to FIG. 4, when a foot cover 700 couples with a top cover 300, The rotating base 220 of the lower stratum is embedded in the first step stratum 702 and stopped by the edge of the first step stratum 702. The second limitative set 430 is mounted on the rotating base 220 of the lower stratum, so that the inner side of the slip ring 500, that is mounted in the fourth limitative slot 432, tightly contacts the contact part 207 extended from the contact piece 201 as shown in FIG. 16.

The rotating base 220 of the middle stratum is embedded in the third limitative slot 431 of the second limitative set 430, so that the downside of the contact lump 502 of the slip ring 500 is inserted into the third bar trough 433. The upside of the contact lump 502, that is placed in the middle stratum, is inserted into the second bar trough 417. The first limitative set 410 and the second limitative set 430 are coupled together. The first raised place 416 of the first limitative set 410 inserts into the second trough 436 of the second limitative set 430. Finally, the slip ring 500 is inserted into the second limitative slot 412 and the third limitative slot 431. The first ring trough 415 receives the rotating base 220 from the middle stratum.

The rotating base 220 of the upper stratum is embedded in the first limitative slot 411. The ridge 313 of the rotating cover 310 is inserted into the trough 208 of the rotating base 200 placed in the upper stratum. So, the rotating cover 310 presses the rotating base 200, placed in the upper stratum, into the hollow housing 100.

When revolving the power plug 1, the top cover 300 and the foot cover 700 stay still. The rotating bases 200 placed in the three stratum are rotated by the blades 202, 203 and 204. The relative motion only occurs between the slip ring 500 and the rotating base 200. So the present invention of the power plug 1 reduces the superfluous friction that occurs when rotating.

The foregoing description of the present invention has been presented for purposes of illustration and description. It is not intended to be exhaustive or to limit the invention to the precise form disclosed, and obviously many modifications and variations are possible in light of the above teaching. Such modifications and variations which may be apparent to those skilled in the art are intended to be included within the scope of this invention as defined by the accompanying claims.

What is claimed is:

1. A power plug, comprising: a hollow housing having a wire hole in the end;
   a limitative set received in the hollow housing, wherein a middle inner side of the limitative set extends interiorly to form a loop, a top of the loop defining a first limitative slot, a bottom of the loop defining a second limitative slot;
   at least two slip rings placed into the first limitative slot and the second limitative slot respectively and insulated from each other by the loop located at the middle inner side of the limitative set;
   at least two bases each placed in the first limitative slot and the second limitative spot respectively, revolvingly contacting each slip ring, insulated by the loop located at the limitative set; and
   at least two blades mounted in each base and electrically connected to the slip rings;
   wherein a ring rim of each base extends upwardly to form a ring wall, the ring wall defines at least a notch through the lateral of the ring wall, the inside of the ring wall receives a contact piece, the contact piece has a contact lump which is embedded in the notch, the tip of the contact lump bends to form a contact part and extend out of the notch to tightly contact the slip ring by the contact part, each blade which mounted in each base electrically contacts the contact piece.

2. The power plug as claimed in claim 1, wherein the side of the slip ring extends outwardly to form a limitative end, a top surface of said limitative end and a top surface of the slip ring are seated at the same height level, a topside of the limitative end is perpendicularly bent to form a contact lump.

3. The power plug as claimed in claim 2, wherein the top of the first limitative set defines a first bar trough through a sidewall of the first limitative set, said limitative end is embedded into the first bar trough and extends outwards of the first limitative set.

4. The power plug as claimed in claim 1, wherein said contact piece is received in an inside of the ring wall, a center of side contact piece has a circular cavity, three contact arms are distributed around the circular cavity such that the angle between the contact arms therein is about 120-degrees, three contact arms radiate from the circular cavity and are embedded in three notches defined in the ring wall respectively.

5. The power plug as claimed in claim 4, wherein at a bottom of ~ the base protrudes a shaft, the circular cavity of the contact piece receives said shaft, the side of the circular cavity defines a penetrate hole, a rivet inserted from the penetrate hole to a round hole defined in a top end of the blade to firmly couple the blade to the contact piece.

* * * * *